Aug. 28, 1962  F. C. WILSON  3,051,824
HONEYCOMB CORE MACHINE
Filed Jan. 10, 1958  6 Sheets-Sheet 1

INVENTOR.
FRANK C. WILSON,
BY
Mason & Graham
ATTORNEY.

Aug. 28, 1962   F. C. WILSON   3,051,824
HONEYCOMB CORE MACHINE
Filed Jan. 10, 1958   6 Sheets-Sheet 2

FRANK C. WILSON,
INVENTOR.

BY Mason & Graham
ATTORNEYS.

INVENTOR.
FRANK C. WILSON,
BY
Mason & Graham
ATTORNEYS.

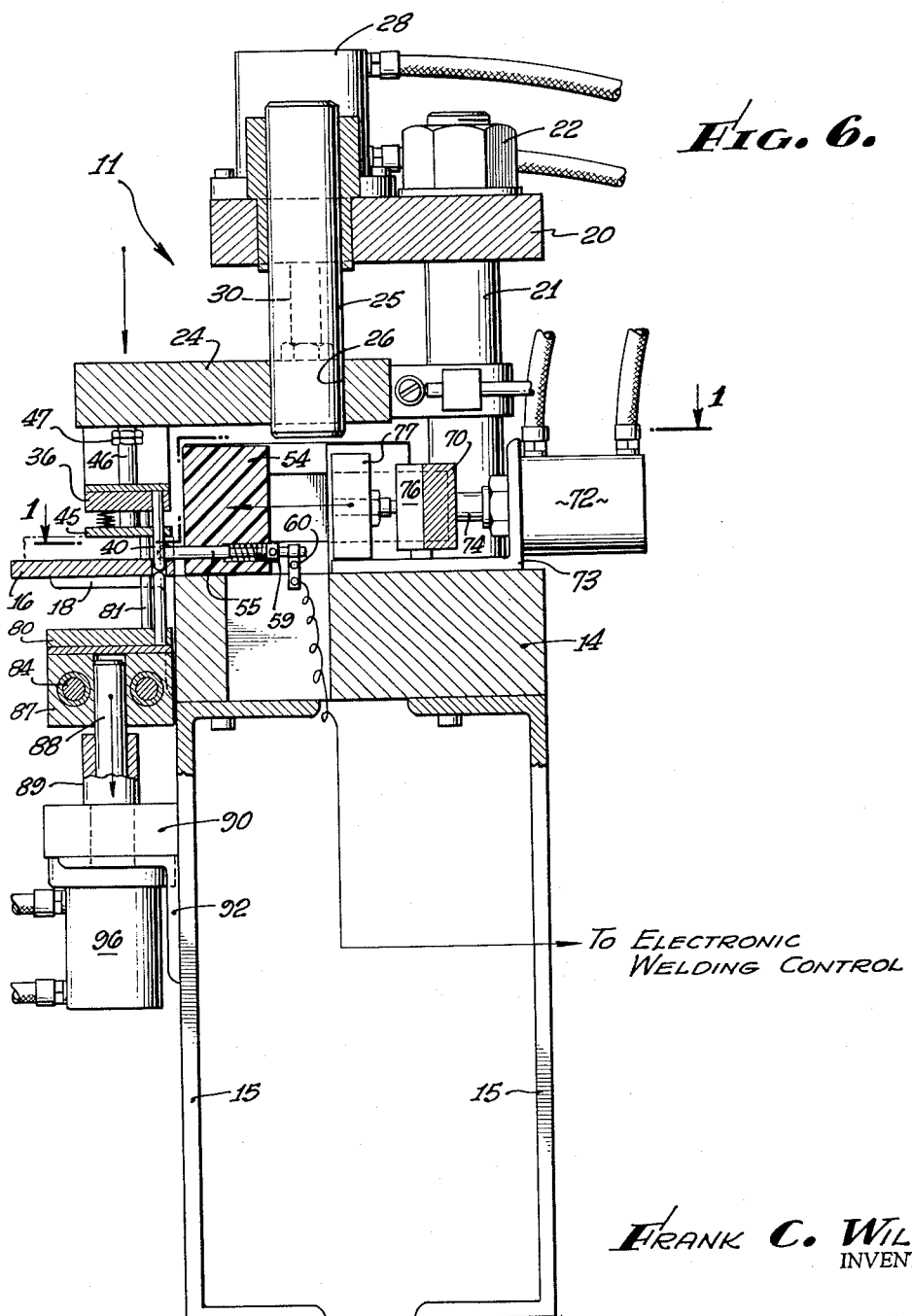

Aug. 28, 1962 F. C. WILSON 3,051,824
HONEYCOMB CORE MACHINE
Filed Jan. 10, 1958 6 Sheets-Sheet 5
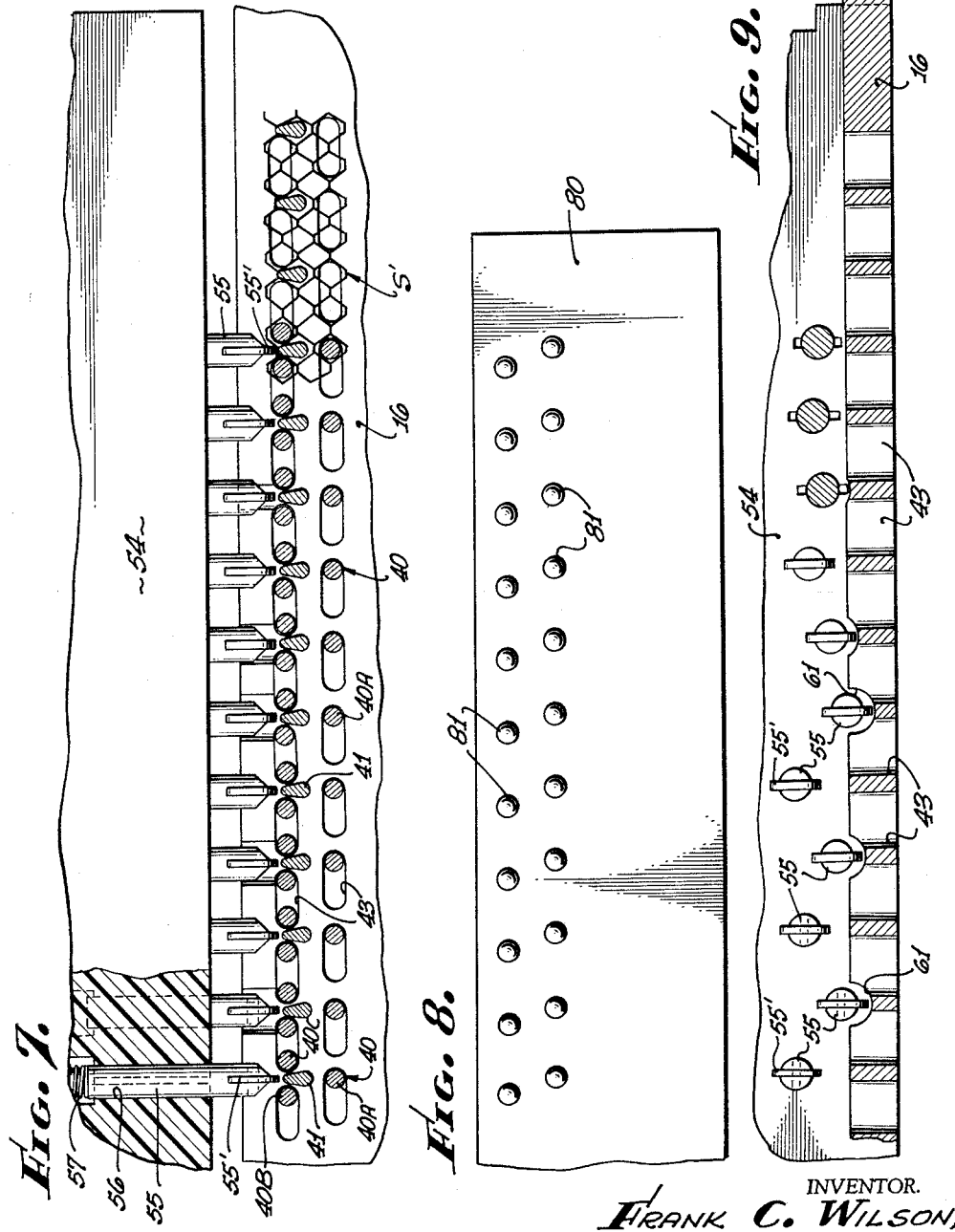
INVENTOR.
FRANK C. WILSON,
BY
ATTORNEYS.

Aug. 28, 1962 F. C. WILSON 3,051,824
HONEYCOMB CORE MACHINE
Filed Jan. 10, 1958 6 Sheets-Sheet 6
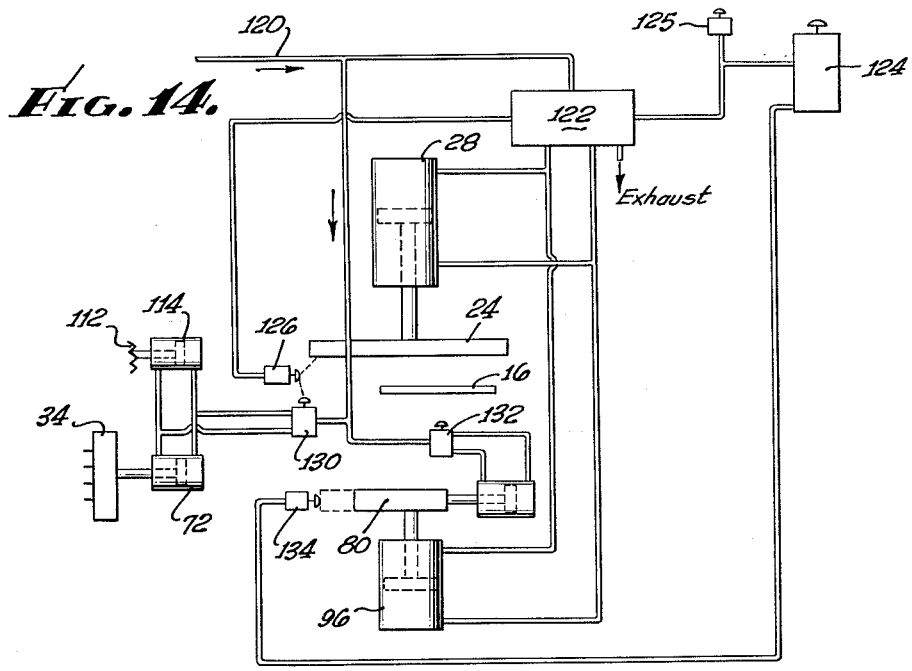
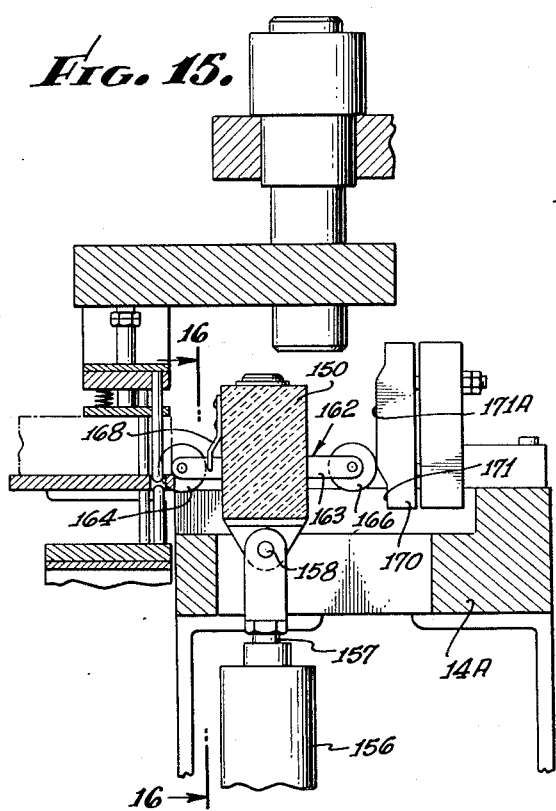
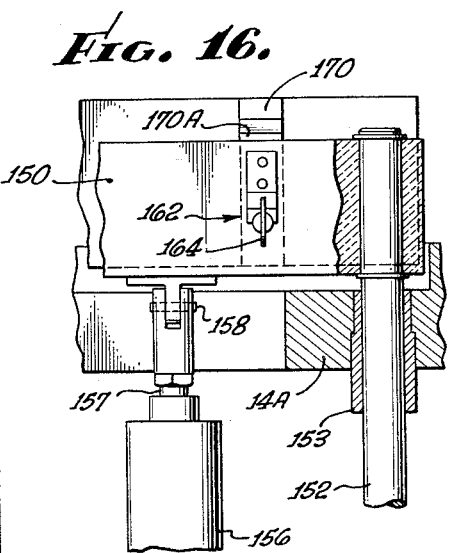
INVENTOR.
FRANK C. WILSON
BY
Moran & Graham
ATTORNEYS.

… …

United States Patent Office 3,051,824
Patented Aug. 28, 1962

3,051,824
HONEYCOMB CORE MACHINE
Frank C. Wilson, Laguna Beach, Calif.
(848 Sonia Way, Mountain View, Calif.)
Filed Jan. 10, 1958, Ser. No. 708,322
7 Claims. (Cl. 219—80)

This invention has to do with the making of honeycomb core structures from metallic ribbon stock.

Honeycomb core structures are used in airplanes, missiles and the like for providing high-strength, light-weight skin structures. At present, honeycomb core material is largely made by hand by an extremely slow, laborious process which results in a very high-cost product. While various attempts have been made to completely mechanize the process, such attempts, so far as I know, have not proved to be entirely successful.

An object of the present invention is to provide a novel machine for automatically fabricating honeycomb core structures from metal ribbon stock wherein the entire fabrication process is carried out by machine. In this connection, it is an object to provide a machine which produces a continuous or endless band of the fabricated product by circulating the product in a loop and continually adding to one side thereof by welding new strip stock to the previously formed product until the desired width of product is achieved.

A further object is to provide a machine of the type indicated which includes novel means for intermittently simultaneously advancing the stock and the product being formed, together with means for holding the stock and product stationary in proper position for welding between periods of movement.

Another object is to provide novel means for rapidly welding the product being formed in a manner to insure a continuous welded joint from one side to the other of the product along each welded seam. In this connection, it is an object to provide a plurality of welding electrodes so positioned that each electrode in turn contacts and welds a given predetermined portion of the seam as the work progresses through the machine.

These and other objects will be apparent from the drawings and the following descriptions. Referring to the drawings:

FIG. 6 is a sectional view on line 6—6 of FIG. 4;

FIG. 7 is a fragmentary sectional view on line 7—7 of FIG. 5;

FIG. 8 is a fragmentary sectional view on line 8—8 of FIG. 5;

FIG. 9 is a fragmentary sectional view on line 9—9 of FIG. 5;

FIG. 14 is a diagrammatic view of the fluid-operated components and their controls;

FIG. 15 is a fragmentary sectional view similar to FIG. 6, but showing a modification; and, FIG. 16 is a fragmentary sectional view on line 16—16 of FIG. 15.

Figure 1:
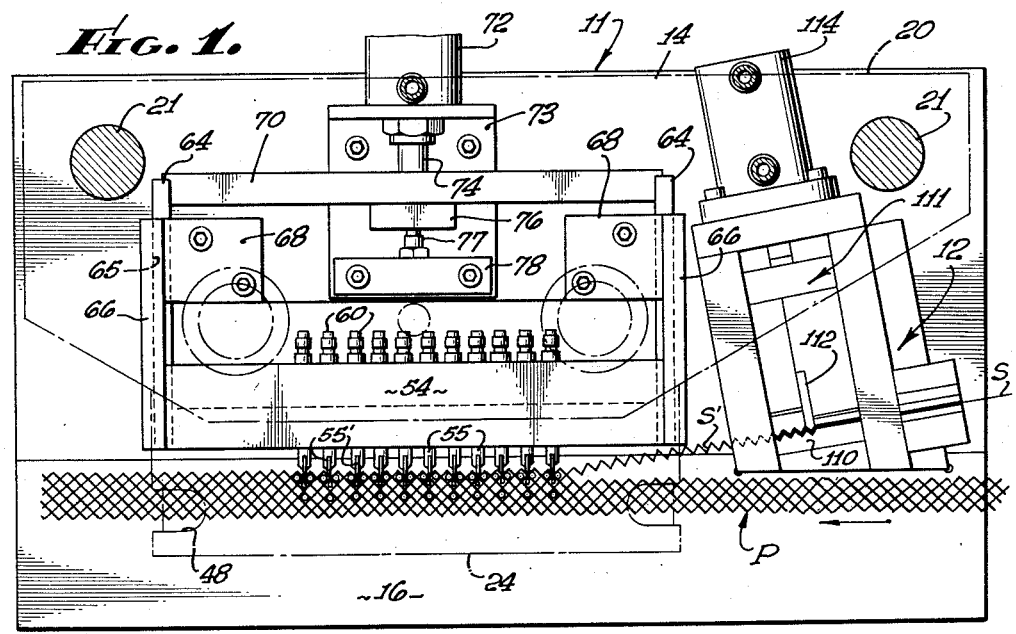
FIG. 1 is a sectional plan view on line 1—1 of FIG. 6.

More particularly describing the invention, referring first to FIG. 1, I show a machine 11 embodying the invention for making honeycomb core product, designated "P," from metal strip or ribbon stock, designated "S." The machine progressively feeds the product and the stock from right to left, as viewed in FIG. 1. The product may continue for any desired distance beyond the machine and may be formed into a loop so that the stock can be continually added thereto at the side as the product is advanced thereby to build up the product laterally until the product is of the desired width. Numeral 12 designates a means for forming the flat ribbon stock S into the corrugated form S' characterized by diagonal sections $a$ and $b$ connected by short straight sections $c$ and $d$ (FIG. 12), prior to the welding of the stock to the portion of the product which has previously been formed. The means 12 operates in timed relation with the machine 11, and, as will later appear, the machine 11 intermittently feeds both the product being formed and the stock, welding the stock to the product being formed during the periods when these are at rest.

The machine has a base 14 which is shown supported upon a stand made up of a pair of channel members 15. A stock slide or work-supporting shelf 16 is provided along the front margin of the base, being mounted upon brackets 18 secured to the base in any suitable manner.

The base supports a top plate 20 upon a pair of laterally spaced posts 21. The latter are threaded at their upper ends to accommodate nuts 22. The top plate is parallel to the base but spaced a substantial distance thereabove.

Between the base and top plate I provide a vertically movable ram 24 which travels upon a pair of depending guide pins 25 mounted in the top plate, ram 24 having bores 26 to slidably receive the pins. The top plate carries a vertical cylinder 28 which is centrally disposed with reference to the ram 24. The ram is suspended upon a piston rod 30 of piston 31 in cylinder 28, the lower end of the rod being mounted in a threaded bore 32 in the ram. Adjustable abutments 34 mounted in and depending from the top plate serve to limit upward movement of the ram.

Figure 13:
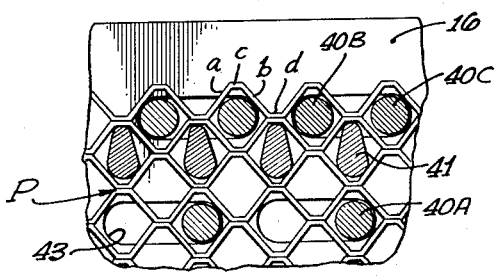
FIG. 13 is a section on line 13—13 of FIG. 11.
Figure 4:
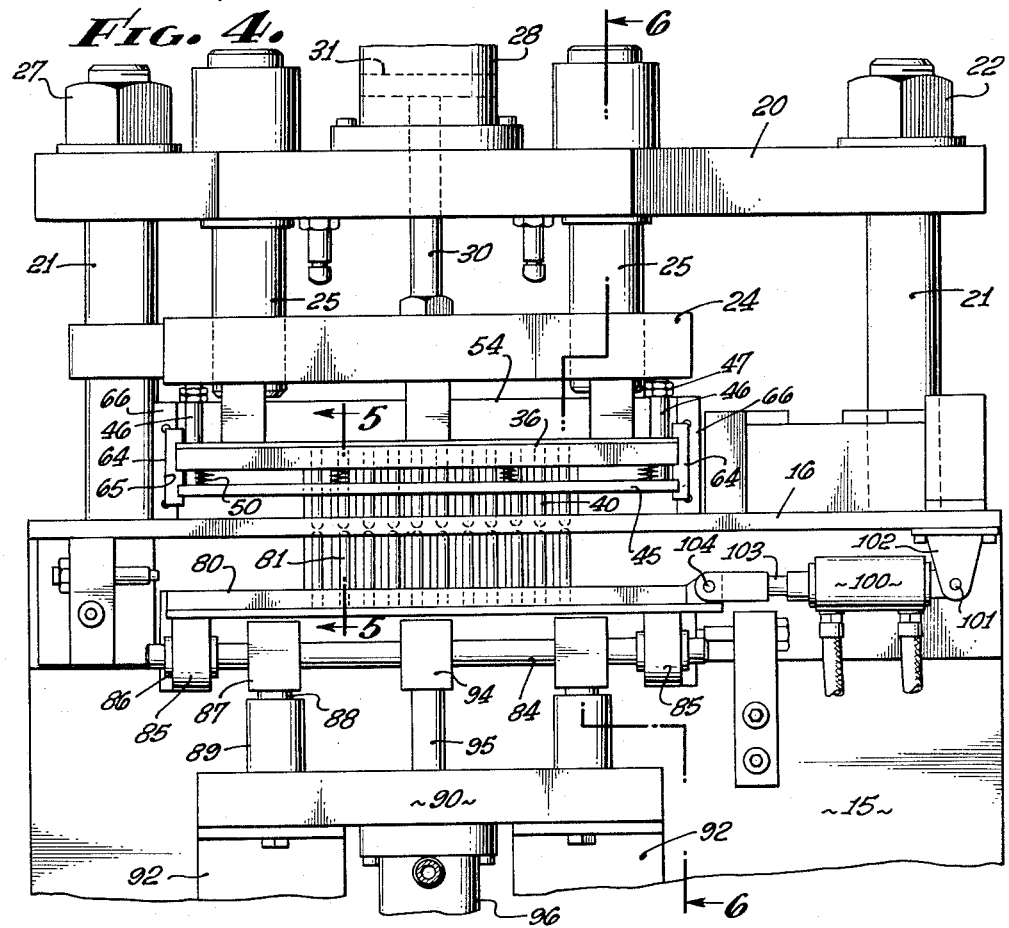
FIG. 4 is an elevational view similar to FIG. 2, but showing the parts in welding position.

A pin rack 36 is suspended from the ram 24 upon spacer blocks 37 which are fixedly secured to the rack and ram by any suitable means, such as machine screws, not shown. The pin rack carries a plurality of sets of cylindrical positioning pins 40, each set comprising three pins 40A, 40B, and 40C arranged triangularly, as best shown in FIG. 7. The rack also carries a plurality of welding back-up pins 41. These are located, respectively, behind pins 40A and partially between pins 40B and 40C. The back-up pins are somewhat wedge-shaped in cross section to accommodate the work, as best seen in FIGS. 7 and 13.

Figure 11:
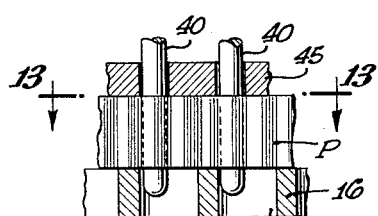
FIG. 11 is a fragmentary sectional view similar to FIG. 10, but showing the parts in down, or welding, position.
Figure 5:
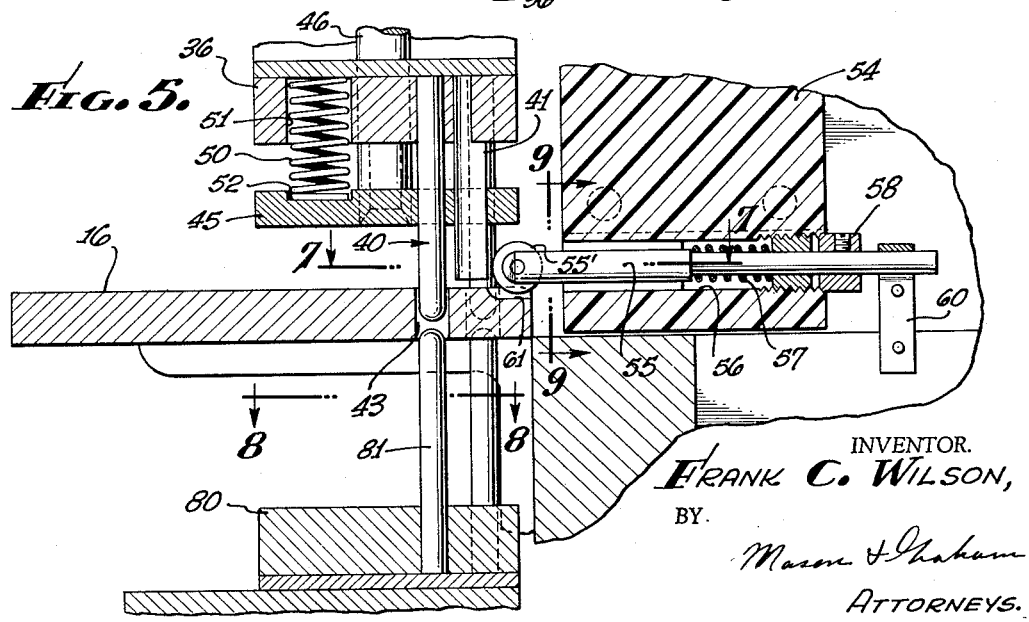
FIG. 5 is a sectional view on line 5—5 of FIG. 4, but on a larger scale.

The work-supporting ledge or shelf 16 is provided with two rows of laterally spaced, diagonally offset slots, designated 43, into which the pins 40A, 40B, and 40C project when the parts are in the down, or weld, position as best shown in FIGS. 5 and 11. The pins 41, being shorter than the index pins, do not reach to the shelf.

Beneath the pin rack I provide a stock stripper plate 45 which is carried upon a pair of guide pins 46 threaded at their upper ends to accommodate adjustment nuts 47. The guide pins are slidably mounted in the pin rack. Recesses 48 in plate 24 provide clearance space for the upper ends of the guide pins. Compression coil springs 50 are mounted in bores 51 in the pin rack and are seated in recesses 52 in the stripper plate, serving to yieldably urge the stripper plate downwardly against the work when the same is present.

Rearwardly of shelf 16 and the pin rack I provide an electrode block 54 of an electric insulation material which carries a plurality of welding electrodes 55. The latter are resiliently mounted for limited axial movement in bores 56 by means of springs 57 which are retained by threaded bushings 58. A set collar 59 on each electrode limits forward movement thereof. At their outer ends each electrode carries a roller 55'. At its inner end is a pigtail 60 for the attachment of a conductor.

The electrodes are evenly spaced longitudinally of the block but are at different elevations, as best seen in FIG. 9, so that each electrode contacts a given portion of the welded seam being formed on the product different from the portion contacted by any other electrode. Together the electrodes cover the entire area of the seam, hence, as the product passes through the machine the seams are progressively welded until complete. The shelf is recessed at 61 where necessary to freely accommodate the lower electrodes.

The electrode block is mounted for movement toward and away from the work upon a pair of slides 64 between which it extends. The slides are movable in opposing recesses 65 in a pair of gibs 66. The latter are secured to the base by anchors 68. The two slides 64 are connected by a tie bar 70 and the entire assembly is actuated by a piston-cylinder unit 72 carried on a bracket 73 secured to the base, the piston rod 74 of the unit being secured to the tie bar. A stop block 76 is provided on the front side of the tie bar for abutting engagement with a set screw 77 carried in a block 78 mounted upon the base. With this construction, the piston-cylinder unit 72 is effective to move the electrode assembly forward into welding position at the proper time and for returning it, as will later be described.

Below the work-supporting shelf 16 I provide a feed pin assembly which includes a pin rack 80 having two, laterally spaced rows of feed pins 81 arranged in diagonally offset relation, as shown in FIG. 8. The pins register with and are received in and, during feeding of the work, project through the slots 43 of the shelf 16.

The pin rack is mounted for endwise movement upon a pair of shafts 84, the pin rack having a pair of depending mounting blocks 85 provided with bushings 86 for slidably receiving the shafts. The latter are mounted in two blocks 87 which are carried upon vertically movable guide posts 88, mounted in bushings 89 carried upon a support 90. The support is mounted on a pair of brackets 92 secured to one of the channel members 15 beneath the base. Centrally of the shaft I provide a mounting block 94 which is supported upon the piston rod 95 of a piston-cylinder unit 96 mounted on the support 90. Thus it will be apparent that the shafts 84 and pin rack 80 are mounted for vertical movement while at the same time the pin rack may be shifted horizontally upon the shafts. The horizontal or endwise movement of the pin rack is effected by the piston-cylinder unit 100 which is pivotally mounted at 101 to a bracket 102 on the underside of the work-supporting shelf. The piston rod 103 of this unit is pivotally connected at 104 to the adjacent end of the pin rack.

Figure 12:
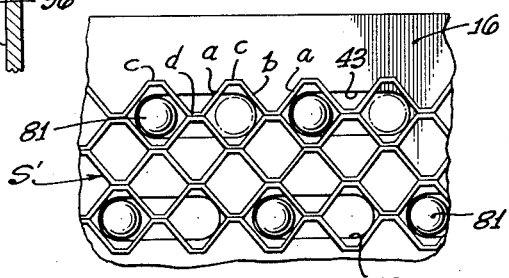
FIG. 12 is a section on line 12—12 of FIG. 10.

As previously indicated, the means 12 is provided for forming the flat ribbon stock S into the special corrugate-shaped stock S', the shape of which is best illustrated in FIG. 12. The means for corrugating the stock includes a stationary die 110 and punch assembly 111, including the punch element 112. The assembly is reciprocated by means of a piston-cylinder unit 114 which is operated in timed relation with apparatus 11 in a manner hereinafter explained.

Figure 2:
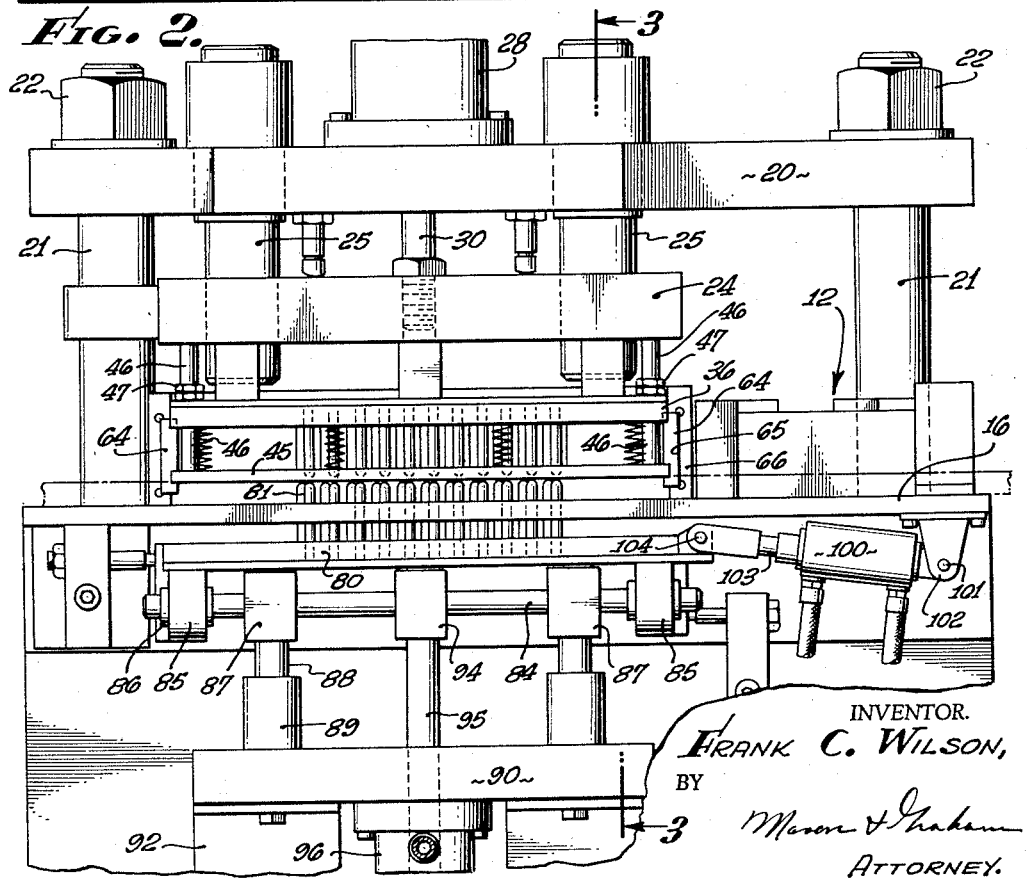
FIG. 2 is a fragmentary elevational view of the front of the apparatus of FIG. 1.
Figure 3:
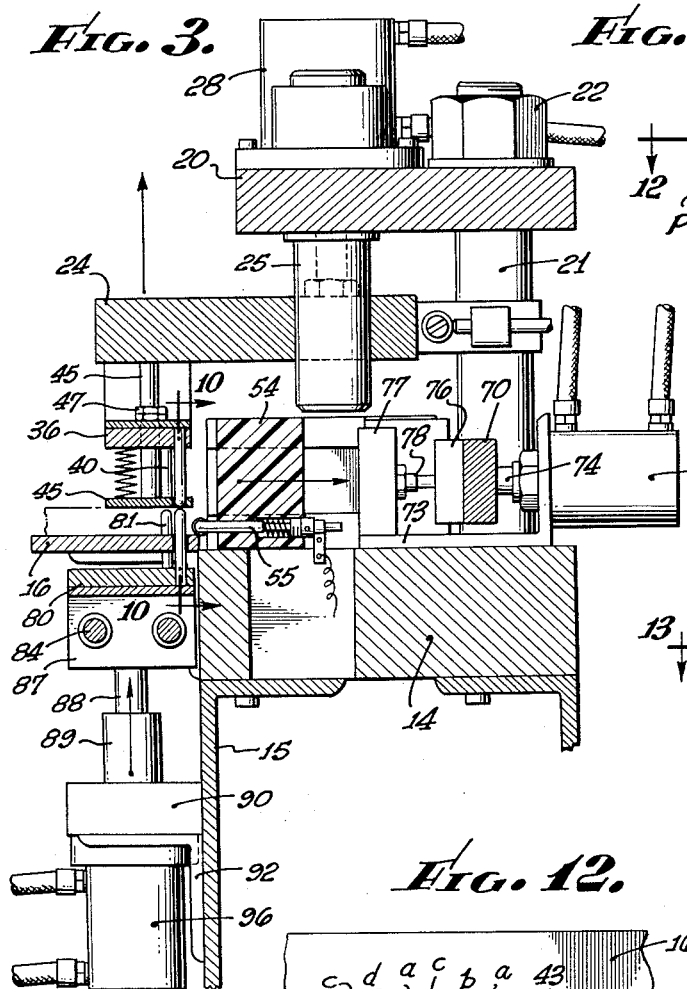
FIG. 3 is a sectional view on line 3—3 of FIG. 2.
Figure 10:
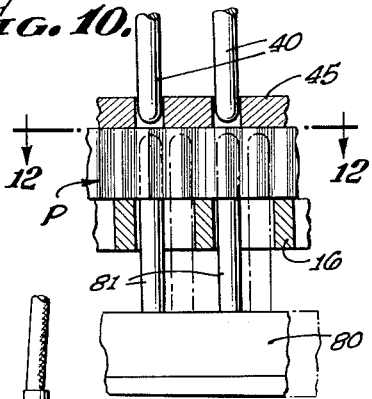
FIG. 10 is a fragmentary sectional view on line 10—10 of FIG. 3.

Generally, in the operation of the apparatus, the ram 24, with its positioning pins 40 and electrode back-up pins 41, and the feed pin rack together with its pins move downwardly from the position in which they are shown in FIGS. 2, 3, and 10 to the position of FIGS. 1, 4, 5, and 11, the positioning pins entering the work or portion of the product which has previously been formed and the feed pins leaving the same and dropping below the work-supporting shelf. With the positioning pins and welding back-up pins in place, the electrode assembly, including the electrode block, moves forward from the position of FIG. 3 to that of FIGS. 4 and 5, the electrodes contacting the work. Substantially coincident with the downward movement of the ram, the punch assembly of the forming means 12 moves forwardly to engage the stock. Subsequently the feed rack moves from left to right as viewed in FIGS. 1, 10, and 11 and at the appropriate time rises to engage the work. The electrode assembly is withdrawn to the position of FIG. 3 and the ram rises, freeing the work of the positioning pins. The feed pins then move from right to left, advancing the work for the next pitch or cycle of operation.

In FIG. 14 I show a diagrammatical representation of one means for operating and coordinating the various fluid-operated components of the apparatus. Preferably I operate the various units by compressed air, however it will be apparent that the various parts of the machine could be electrically operated or operated by a combination of electrical and pneumatic means. In FIG. 14 numeral 120 designates a supply line which may lead from a source of air under pressure (not shown). The supply line connects with a four-way valve 122. This may be a standard type which is moved to its various positions successively against self-contained spring means by air pressure controlled by other valves, namely, valves 124, 125, and 126. Valve 124 is an automatic cycling valve which, when manually initially actuated, places the machine on automatic operation. Valve 125 enables actuating the machine on a step-by-step basis for the purpose of threading the machine and testing it until such time as it is ready for automatic operation.

Valve 126 is actuated upon downward movement of the ram 24 when the latter reaches its lowermost position. Valve 126 in turn actuates the valve 130. The latter, when actuated, serves to supply fluid to the outer ends of the piston-cylinder units 72 and 114 which operate the electrode member 34 and the forming punch 112, respectively. Any conventional welding control means may be used for timing the welding current. Valve 126 also serves to step the valve 122 to its next position and this in turn reverses the flow of fluid pressure to the piston-cylinder units 28 and 96.

A valve 132 controls the unit 100 being actuated when feed pin rack 80 reaches its upper position. A valve 134, which is positioned for actuation when feed pin rack 80 moves to the left, actuates valve 124 to in turn cause the valve 122 to move to its next successive position.

In the operation, assuming ram 24 and feed pin rack 80 are in up position, upon actuation of valve 124 this moves valve 122 to supply fluid to the upper ends of the cylinder units 28 and 96, causing ram 24 and feed pin rack 80 to move down. When ram 24 reaches its lower position, it actuates valve 126 which in turn actuates valve 130 to cause cylinder units 72 and 114 to move the electrode holder 34 and forming punch 112 forward. Also, valve 126 resets valve 122 to reverse flow of pressure fluid to cylinders 28 and 96. As rack 80 rises and reaches its upper position valve 132, which is carried by the assembly, is actuated to cause unit 100 to move the feed pin rack 80 to the left. When this reaches its limit of travel the valve 134 is actuated and a new cycle of operation begins.

Referring now to FIGS. 15 and 16, I show a modification wherein I provide roller or seam electrodes which traverse the seam to be welded from one end to the other in place of the spot-weld type previously described. Here an electrode block 150 of electrical insulation material is mounted for vertical movement on guide pins 152 mounted in bushings 153 in the base 14A. A piston-cylinder unit 156 has its piston rod 157 pivotally connected at 158 to the block 150, serving as a means for moving the block vertically.

The block is provided with a plurality of electrodes 162 each of which includes a main portion 163 mounted for axial movement in the block. An electrode roller 164 for contacting the work is carried at the forward end of each member. At its other end is a cam follower roller 166. The electrode is biased away from the work by a spring 168. A vertically positioned cam track 170 is provided for each of the electrodes. This includes a cam face 171 which has a high area 171A for moving the electrode outwardly into engagement with the work as the electrode block or holder moves upwardly. The piston-cylinder unit 156 is operated in timed relation with the other elements of the machine and the stroke thereof may be controlled by any conventional means to adjust the travel of the electrode block to the height of the work.

Although I have illustrated and described a preferred form of my invention, I contemplate that various changes and modifications can be made therein without departing from the invention, the scope of which is indicated by the following claims.

I claim:
1. In a machine for fabricating a honeycomb core product from metal ribbon stock, a supporting frame structure providing a work-supporting shelf over which the product being formed is advanced, a plurality of depending positioning pins mounted above said shelf for vertical movement, a plurality of vertical electrode back-up pins mounted with said positioning pins and movable therewith a plurality of upright feed pins mounted beneath said shelf for vertical and for horizontal movement, said shelf having pin-receiving slots, a plurality of welding electrodes mounted for horizontal movement toward and away from a product being formed on said shelf and in registration with said back-up pins, and means for actuating said positioning pins and back-up pins, said feed pins and said electrodes in timed relation whereby the product being formed is advanced by said feed pins, engaged by said positioning pins and back-up pins and engaged by said electrodes in succession.

2. In a machine for fabricating a metal honeycomb core product, a supporting frame structure providing a work-supporting shelf, said shelf having slots therein extending in the direction work is to be advanced thereover, a vertically movable positioning pin rack supported above said shelf, depending positioning pins mounted in said rack positioned to register with said slots, a vertically and horizontally movable feed pin rack supported beneath said shelf, upright feed pins mounted in said feed pin rack, a welding electrode block mounted behind said shelf and movable horizontally toward and away from work on the shelf, a plurality of welding electrodes carried by said block in position to contact work on said shelf when said electrode block is moved forward, a plurality of electrode back-up pins carried by said positioning pin rack for registration with said electrodes, means for lowering and raising said positioning pin rack, means for moving said electrode block forward and backward in predetermined timed relation with the movement of said positioning pin rack, and means for moving said feed pin rack vertically and horizontally in a rectangular path in predetermined timed relation with said positioning pin rack, said feed pins extending through the slots in said shelf in the upper position of said feed pin rack.

3. In a machine for fabricating a honeycomb core product from metal ribbon stock, a base, a top plate supported above said base in vertically spaced relation thereto, a ram supported for limited vertical movement between said base and said top plate, a positioning pin rack carried by said ram, a plurality of depending positioning pins mounted in said rack, a work-supporting shelf beneath said positioning pin rack, said shelf having slots beneath said pins to receive the same, a feed pin rack beneath said shelf, a plurality of upright feed pins mounted in said feed pin rack adapted to project through said slots in said shelf to engage work thereon, means mounting said feed pin rack for vertical and horizontal movement, an electrode block mounted on said base for movement horizontally toward and away from said shelf, a plurality of horizontally disposed, laterally spaced electrodes in said block at different elevations, and power means for actuating said ram, said feed pin rack and said electrode block in timed relation.

4. In apparatus for fabricating a honeycomb core product from corrugated metal ribbon stock wherein the stock is progressively attached to the portion of the product previously formed by horizontally spaced vertically extending weld seams, means for forming said seams, comprising a battery of welding electrodes, the individual electrodes of said battery being horizontally spaced to register with the seams to be formed and being individually vertically spaced at different elevations and so proportioned in size with reference to the seams that each electrode covers only a given portion of each seam, means for advancing the work intermittently step by step past said electrodes, and means for moving said battery of electrodes toward and away from the work.

5. Means for forming welded seams as set forth in claim 4 in which a battery of electrode back-up pins is provided and in which means is provided for causing said pins to enter said work behind said seams in timed relation with the operation of said electrodes.

6. In a machine for fabricating a honeycomb core product from metal ribbon stock, a frame structure providing a work-supporting surface, feed means for intermittently advancing the work over said surface, means for holding the work and providing welding back-up means in areas thereof to be welded, a welding electrode holder mounted for movement in a direction parallel to a seam area of the work to be welded, a roller type welding electrode mounted in said holder for movement toward and away from the work in a direction normal to the direction of movement of said holder, cam means carried by said frame structure for camming said electrode into engagement with the work upon movement of said holder, and means for moving said holder in timed relation with said feed means.

7. A machine as set forth in claim 6 in which said holder carries a plurality of electrodes and in which spring means is provided for biasing said electrodes toward said cam means.

References Cited in the file of this patent
UNITED STATES PATENTS

| | | |
|---|---|---|
| 1,074,383 | Rietzel | Sept. 30, 1913 |
| 1,826,207 | Fassler | Oct. 6, 1931 |
| 2,057,794 | Sorenson et al. | Oct. 20, 1936 |
| 2,423,870 | Blessing | July 15, 1947 |
| 2,747,064 | Pappelendam | May 22, 1956 |
| 2,780,716 | Wasilisin et al. | Feb. 5, 1957 |
| 2,789,203 | Pigo et al. | Apr. 16, 1957 |
| 2,821,616 | Spott | Jan. 28, 1958 |
| 2,843,722 | Wegeforth | July 15, 1958 |